Nov. 19, 1957  A. MEIXNER  2,813,470
DEVICE FOR SETTING THE SHUTTER IN PHOTOGRAPHIC CAMERAS
Filed Feb. 10, 1955
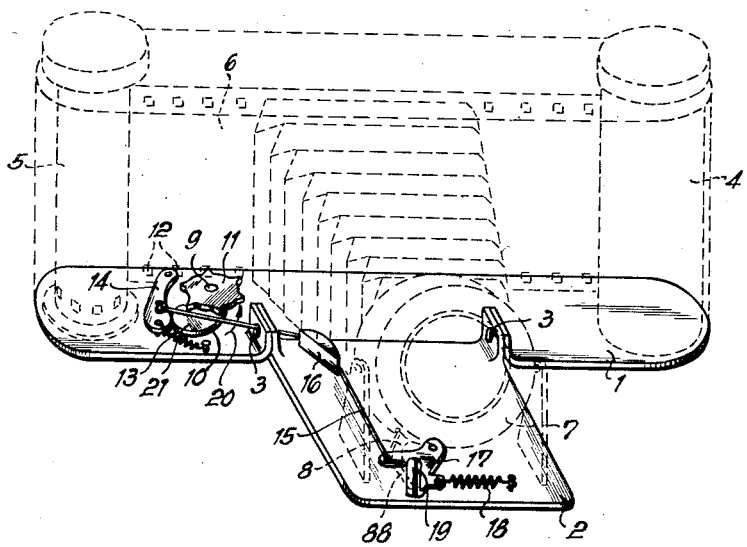
INVENTOR
ALFRED MEIXNER
BY *Mock & Blum*
ATTORNEYS 2,813,470

Patented Nov. 19, 1957

2,813,470

DEVICE FOR SETTING THE SHUTTER IN PHOTOGRAPHIC CAMERAS

Alfred Meixner, Braunschweig, Germany, assignor to Voigtlander Aktiengesellschaft, Braunschweig, Germany, a joint-stock company of Germany Application February 10, 1955, Serial No. 487,413

Claims priority, application Germany February 18, 1954

2 Claims. (Cl. 95—31)

This invention relates to photographic cameras and it has particular relation to means for adjusting the shutter, particularly for setting the shutter in folding cameras.

Folding cameras comprising laterally arranged means for setting the shutter, have been known from the art. In these known devices, the setting movement is transmitted by means of levers, rods or the like, to the base-board of the camera and from there to the setting lever of the shutter. The transmission system required in this connection comprises many members and is complicated, because, on the one hand, the movement must be transmitted and, on the other hand, the swinging character of the base-board must be preserved.

According to another suggestion known from the art, drawing means are used for transmitting operating movements to the shutter. Such means is guided over rollers, which are arranged at the joints of the strut or spreader system holding the base-board and the shutter. This arrangement is not advantageous insofar as several, movable turning points have to be used. Furthermore, owing to the finite dimensions of the rollers an undesired displacement of the drawing means occurs.

In carrying out the present invention, likewise a drawing means is used. However, the present invention avoids the above mentioned disadvantages of the known arrangements and results in a particularly simple and inexpensive transmission of motion between the adjusting means of the camera, particularly the shutter-setting means, and the swinging or tilting base-board of the camera, whereby, upon swinging of the base-board, no displacement of the transmission members occurs.

The invention consists in that for the transmission of motions, particularly the shutter setting motion, from the camera body to the base-board of the camera, a drawing means, for example a cable rope or chain, is arranged in such manner that, in the range of the passage from the camera body to the base-board, said drawing means at least approximately passes along the swinging axis which connects the base-board with the camera.

According to a preferred embodiment of the invention, the base-board is swingably connected with the camera by means of hollow rivets, through which the drawing means is passed. On the base-board a guide member is provided which guides the drawing means to the camera shutter.

In a specific embodiment of the invention an open cable drive is used. In the latter, an eccentric disc is provided laterally in the camera. Said disc, which is turned once by 360° upon each advance of the film by a picture length, is caused to rotate for example by a cog wheel which is firmly connected with the disc and engages perforations of the film. Under the effect of a spring, a control lever lies against the periphery of the disc, and carries out a to and fro movement.

Instead of a cable, a chain can also be used, and the guide member can be substituted by a guide roll, by which a smaller loss by friction is caused. The control lever is connected with the drawing means, which is passed through a bearing of the base-board and leads over a guide member to a setting member which is swingably arranged below the camera shutter. This setting member may consist of an angle lever which is under the effect of a return spring and is provided with a nose or projection for engaging the setting member of the shutter.

The invention is illustrated in the appended drawing by an example, to which the invention is not limited. The drawing shows purely diagrammatically the open cable mechanism which passes from the lower base part of a miniature camera to the base-board linked thereto, whereby the camera body and other parts which are of interest for understanding the invention, are added in dotted lines.

In the drawing, reference numeral 1 denotes the lower base part of the camera, to which base-board 2 is swingably fastened by means of two hollow rivets 3. Reference symbol 4 denotes the film casing, 5 the take up spool and 6 the film. 7 indicates the shutter provided with shutter setting lever 8. On the lower base part 1 of the camera, an eccentric disc 10 and a pinion 11 are rotatably arranged on a common axis 9, said disc and pinion being firmly connected with each other. Pinion 11 which engages film perforations 12, is dimensioned in such manner that it carries out one full rotation, together with disc 10, upon advance of the film by one picture length. Adjusting lever 14 lies against the outer periphery of disc 10 under the effect of spring 13. This lever carries out one swinging movement to and fro during each complete rotation of disc 10. Lever 14 is connected with the drawing means, i. e. in the present example with cable 15, which is passed through one of the bearings 3 and after being guided by member 16, is fastened to an angle-like setting member 17 which is arranged below camera shutter 7 on base-board 2 and effects further guiding of the movement in a right angle. Setting member 17 is under the effect of a return spring 18 and is provided with projecting member 19, which is in connection with a projection 88 provided on setting lever 8 of shutter 7.

In the position shown in the drawing, setting lever 8 of shutter 7 is set by nose 19 of setting member 17, but member 17 is not returned yet by spring 18. Return of parts 14, 15 and 17 to their rest position, takes place upon further rotation of disc 10 in the direction of arrow 20, as soon as adjusting lever 14 is released by cam 21 of disc 10.

Suitably modified embodiments of the invention can be used also for effecting release of the shutter, or, if desired, adjustments of the diaphragm or time, from the camera body.

It will be understood from the above that the invention is not limited to the specific means, designs and other details specifically described above and can be carried out with various modifications without departing from the scope of the invention, as defined in the appended claims.

What is claimed is:

1. A photographic camera including a base-board which is tiltably connected with the body of the camera, a shutter carried by said base-board, being movable with the base-board and being connected with the body of the camera by a bellows; a handling member for operation of the shutter, said member being arranged in the camera body; a connecting member between said handling member and the shutter, for transmitting drawing movement from the handling member to the shutter, said connecting member consisting of a flexible element, one end of which is connected to a swingable setting member which is arranged on the base-board below the shutter and is connected with an operating member of the shutter, while its other end is connected to a setting lever which is provided on the lower base part of the camera and is connected with said handling member, said flexible element passing in its range between the lower base part of the camera and the base-board at least approximately along the pivot axis connecting the base-board with the camera; the base-board being linked with the camera by means of two hollow rivets, through one of which the flexible element is passed.

2. A photographic camera including a base-board which is tiltably connected with the body of the camera, a shutter carried by said base-board, being movable with the base-board and being connected with the body of the camera by bellows; a handling member for operation of the shutter, said member being arranged in the camera body; a connecting member between said handling member and the shutter, for transmitting drawing movement from the handling member to the shutter, said connecting member consisting of a flexible element, one end of which is connected to a swingable setting member which is arranged on the base-board below the shutter and is connected with an operating member of the shutter, while its other end is connected to a setting lever which is provided on the lower base part of the camera and is connected with said handling member, said flexible element passing in its range between the lower base part of the camera and the base-board at least approximately along the pivot axis connecting the base-board with the camera; said camera comprising an eccentric disc, the rotation of which is derived from transport of the film, the setting lever lying against the periphery of said disc under the effect of a spring and being caused to swing to and fro upon each turn of the disc, the flexible element being guided through a hollow rivet of one bearing of the base-board and over a guide member to a shutter setting member which is under the effect of a spring.

References Cited in the file of this patent
UNITED STATES PATENTS

| 2,126,234 | Harmon et al. | Aug. 9, 1938 |
| 2,132,695 | Mihalyi | Oct. 11, 1938 |
| 2,237,887 | Nerwin | Apr. 18, 1941 |

FOREIGN PATENTS

| 153,571 | Austria | June 10, 1938 |